United States Patent [19]

Miyamoto et al.

[11] Patent Number: 5,430,093
[45] Date of Patent: Jul. 4, 1995

[54] MODIFIED CHLORINATED POLYPROPYLENE, PROCESS FOR PRODUCING THE SAME AND USE THEREOF

[75] Inventors: Takahito Miyamoto, Osaka; Kunitaka Fujiwara; Masanori Kano, both of Hyogo; Takahiko Inoue, Osaka, all of Japan

[73] Assignee: Sakata Inkusu Kabushikikaisha, Japan

[21] Appl. No.: 958,780

[22] Filed: Oct. 9, 1992

Related U.S. Application Data

[60] Continuation of Ser. No. 762,723, Sep. 16, 1991, abandoned, which is a division of Ser. No. 212,652, Jun. 28, 1988, abandoned.

[30] Foreign Application Priority Data

| Jun. 29, 1987 | [JP] | Japan | 62-161813 |
| Jun. 29, 1987 | [JP] | Japan | 62-161814 |
| Dec. 21, 1987 | [JP] | Japan | 62-323558 |
| Apr. 12, 1988 | [JP] | Japan | 63-89361 |
| Apr. 12, 1988 | [JP] | Japan | 63-89362 |
| Apr. 12, 1988 | [JP] | Japan | 63-89363 |
| May 20, 1988 | [JP] | Japan | 63-123056 |

[51] Int. Cl.⁶ ............... C08L 23/28; C08K 13/02
[52] U.S. Cl. ................. 524/504; 523/160; 524/507; 525/66; 525/123
[58] Field of Search ............ 525/66, 123; 524/504, 524/507; 523/160

[56] References Cited

U.S. PATENT DOCUMENTS

| 3,594,449 | 7/1971 | Binder . | |
| 4,035,440 | 7/1977 | Khanna | 525/131 |
| 4,728,684 | 3/1988 | Kadowaki et al. | 524/271 |
| 4,863,988 | 9/1989 | Inagaki et al. | 525/315 |
| 5,030,681 | 7/1991 | Asato et al. | 524/504 |

FOREIGN PATENT DOCUMENTS

| 0238702 | 9/1987 | European Pat. Off. . | |
| 0059770 | 4/1984 | Japan | 525/131 |
| 0071373 | 4/1984 | Japan | 525/131 |
| 2171030 | 8/1986 | United Kingdom . | |

OTHER PUBLICATIONS

Anbazhagan et al., Journal of Applied Polymer Science, vol. 30, 1985, pp. 391-400.
Patent Abstracts of Japan, vol. 10, No. 258 (C-370) [2314] Sep. 4, 1986.
Patent Abstracts of Japan, vol. 8, No. 114 (C-225) [1551] May 26, 1984.

*Primary Examiner*—Ana L. Carrillo
*Attorney, Agent, or Firm*—Wenderoth, Lind & Ponack

[57] ABSTRACT

A modified chlorinated polypropylene which has superior properties is obtained by the reaction of a chlorinated polypropylene having a molecular weight in the range of from 5,000 to 500,000 with a polyurethane having a molecular weight in the range of from 600 to 200,000. The modified chlorinated polypropylene exhibits excellent adhesion to various kinds of base film and a satisfactory performance with respect to such after-treatments as lamination, boiling and retort processes, and therefore is useful as a binder resin for printing ink or other coating compositions.

4 Claims, No Drawings

MODIFIED CHLORINATED POLYPROPYLENE, PROCESS FOR PRODUCING THE SAME AND USE THEREOF

This application is a continuation of now abandoned application, Ser. No. 07/762,723, filed on Sep. 16, 1992, which is a division of now abandoned application Ser. No. 07/712,652, filed on Jun. 28, 1988.

BACKGROUND OF THE INVENTION

1. Field of the Invention

The present invention relates to a modified chlorinated polypropylene, process for producing the same and use thereof. More particularly, the present invention provides a modified chlorinated polypropylene which is useful as a binder resin that may be contained in a coating composition for various kinds of plastic film, sheet or other synthetic resin products such as, for example, printing inks, paints and adhesives.

2. Description of the Prior Art

As a result of the recent trend toward greater diversification in the field of packagings or containers and improvements in the functional efficacy of synthetic resin products such as synthetic leather, there has recently been a demand for coating compositions with a high level of performance and quality, for example, printing inks, adhesives and various kinds of paints which are employed for decoration, bonding or surface protection on plastic films, plastic sheets or other synthetic resin molded products.

In particular, printing inks which are used to decorate packagings or containers and improve the quality thereof are required to have versatile adhesion properties with respect to various kinds of composite film. These inks are further required to have properties capable of facilitating the various kinds of processing that are undertaken in after-treatments, for example, suitability for the processing that is carried out in a variety of laminating processes (hereinafter referred to as "suitability for lamination"), as well as the ability to withstand boiling and to be used in retort applications.

In general, printing on plastic films or the like is carried out by gravure, flexography or another similar method. However, When films used as packaging materials are printed, web-fed printing is in many cases carried out and the inks which are used for such printing thus need to have quick-drying properties. In cases where plastic films with ink printing applied thereto are used to packages for food, it is particularly important that the amount of residual solvent be minimized.

Packaging materials are often subjected to dry lamination or extrusion lamination processes after printing for the purpose of improving the performance thereof. In particular, polyester (PET), nylon (NY) or other similar films, which are superior to other kinds of film in strength and airtightness, may be laminated with polyethylenes, polypropylene and the like. In such cases, a urethane adhesive or the like is used for dry lamination, while an anchor coat material is used in the case of extrusion lamination. Aluminum foil may be interposed between the individual laminated films to obtain a packaging material which is suitable for both boiling and retort applications. On the other hand, in the field of ordinary packaging materials where a retort strength is not demanded but a transparent base material is used to form a base, it is also common practice to carry out a laminating process wherein oriented polypropylene (OPP) is employed as a base film and this film is directly covered with molten polypropylene without using an anchor coat material (generally known as "PP direct lamination").

In order to carry out post-processing as described above, the printing inks which are employed in the previous steps need to have not only versatile adhesion properties and suitability for printing on a variety of base films but must also be suitable for the processes which take place in the respective post-processing operations. These properties are mainly determined by the binder resins which are used in the printing inks.

Hitherto, printing inks containing a thermoplastic polyester resin as a binder have been employed for printing on polyester films, and two-pot type inks consisting of a polyester resin having a hydroxyl group and an isocyanate compound have been used for nylon and polyester films. Recently, printing inks containing a polyurethane resin as a binder have been used as inks which display a versatile range of properties with respect to nylon, polyester and other base films.

On the other hand, printing inks which contain a chlorinated polyolefin having a relatively low degree of chlorination, for example, chlorinated polypropylene, are used for polyolefin films subjected to PP direct lamination.

The above-described conventional printing inks suffer, however, from the following problems. The inks that employ a thermoplastic polyester resin as a binder can only be applied to a limited range of base films and have unsatisfactory drying properties. Consequently they suffer from problems in terms of workability and are subject to, for example, the occurrence of blocking. The two-pot type inks which are of the reaction type have a disadvantageously short pot-life and are therefore subject to various restrictions on the range of potential working conditions and also to the economic losses that are incurred when ink which has not yet been used but has been chemically changed has to be discarded. The printing inks that employ a polyurethane resin as a binder exhibit satisfactory adhesion to nylon, polyester and other similar films but still often insufficient adhesion to polyethylene and polypropylene films, which are the most widely used as a base film in the packaging use. Further, the suitability for lamination of these inks, particularly PP direct lamination, is insufficient.

On the other hand, the printing inks that employ a chlorinated polyolefin as a binder exhibit excellent adhesion to polyolefin films but insufficient adhesion to nylon and polyester films and are therefore only applicable to limited kinds of base film. Although this kind of printing ink is suitable for PP direct lamination, it cannot be used in boiling or retort applications and therefore suffers from a limited range of potential uses.

As described above, conventional printing inks have certain problems, that is, the limited range of applicable base films, unsatisfactory adhesion with respect to a wide range of base films despite the possession of general-purpose properties, and a lack of sufficient utility for lamination, and for boiling and retort applications.

Accordingly, the actual practice is to manufacture a printing ink containing a binder which is suitable for both the particular kind of base film to be used and for the processing to be undertaken, e.g., various kinds of lamination and retort processing. Consequently, serious problems have been experienced in the ink manufacturing and, printing processes, as well as in connection with the inventory management of the materials and inks used in these processes.

SUMMARY OF THE INVENTION

It is an object of the invention to provide a modified chlorinated polypropylene comprising a chlorinated polypropylene having a molecular weight in the range of from 5,000 to 500,000 and a polyurethane having a molecular weight in the range of from 600 to 200,000, said chlorinated polypropylene and said polyurethane being combined together through the —A—X— bond shown by the general formula [1], is useful as a binder resin for a coating composition such as a printing ink or a paint which is required to display adhesion with respect to a variety of base films as well as being suitable for various kinds of processing, including suitability for lamination and utility in boiling and retort applications:

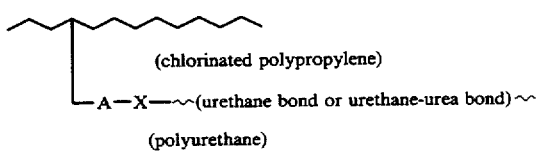

(1)

wherein

A is the residue of a monomer, oligomer or polymer having a radical-reactive unsaturated double bond, and X is one bond group selected from the group consisting of

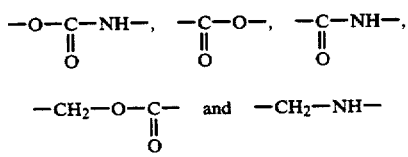

It is another object of the invention to provide a process for producing the modified chlorinated polyprophylene.

It is still another object of the invention to provide the use of the modified chlorinated polyprophylene.

Other objects and advantages of the present invention may become apparent to those skilled in the art from the following description.

DESCRIPTION OF THE PREFERRED EMBODIMENTS

The polyurethane resins which are usable in the present invention as a starting material are those which have a molecular weight in the range of from 600 to 200,000, preferably from 1000 to 150,000. A molecular weight less than 600 readily leads to blocking and is likely to provide insufficient capacity for lamination. Conversely, if the molecular weight exceeds 200,000, the dispersibility of pigment is likely to be lowered.

The above-described polyurethane resins may be produced using a polyether type and/or a polyester type diol compound (molecular weight: 400 to 4,000), an organic diisocyanate compound, and various known other compounds, for example, a chain extender, a reaction terminator, etc., according to need.

Typical examples of polyether type diols usable in the present invention include polyoxyalkylene glycols such as polyethylene glycol, polypropylene glycol and polyoxytetramethylene glycol, and alkylene oxide adducts of bisphenol A, etc. with addition of ethylene oxide, propylene oxide and ethylenepropylene oxide.

Typical examples of polyester type diols usable in the present invention include compounds which are obtained by condensation reaction of a dibasic acid such as adipic acid, phthalic anhydride, isophthalic acid, maleic acid, fumaric acid or succinic acid with a glycol such as ethylene glycol, diethylene glycol, propylene glycol, 1,4-butanediol, neopentyl glycol or 1,6-hexanediol.

Polycaprolatonediol, polycarbonatediol or polybutadienediol may also be used as a diol component in the present invention.

Typical examples of organic diisocyanate compounds usable in the present invention include tolylene diisocyanate, diphenylmethane diisocyanate, xylidine diisocyanate, methylene diisocyanate, isopropylene diisocyanate, hexamethylene diisocyanate, 2,2,4- or 2,4,4-trimethylhexamethylene diisocyanate, lysine diisocyanate, hydrogenated xylylene diisocyanate, 1,4-cyclohexane diisocyanate and isophorone diisocyanate.

From the view of obtaining a resin which has superior solubility, it is preferable to employ an allcyclic diisocyanate such as isophorone diisocyanate, 4,4-dicyclohexylmethane diisocyanate, etc.

Typical examples of diamines usable as a chain extender are ethylenediamine, propylenediamine, hexamethylenediamine, isophoronediamine, dicyclohexylmethanediamine, etc., while typical examples of usable diols as a chain extender are ethylene glycol, propylene glycol, 1,4-butanediol, neopentyl glycol, 1,6-hexanediol, 1,4-cyclohexyl glycol.

Typical examples usable as a reaction terminator include monoamines such as n-butylamine, monoethanolamine, etc., and monoalcohols such as methanol, ethanol, propylene alcohol, etc.

The chlorinated polypropylenes which are usable in the present invention as the other starting material are those which have a molecular weight in the range of from 5,000 to 500,000, preferably from 7,000 to 300,000. A molecular weight less than 5,000 readily leads to blocking and is likely to provide insufficient capacity for lamination. If the molecular weight exceeds 500,000, the solubility will deteriorate.

However, if the degree of chlorination of the chlorinated polypropylene is 20 or less, the solubility thereof in an organic solvent decreases, whereas, if the degree of chlorination is 60 or more, there is a lowering in the degree of adhesion of the resulting modified chlorinated polypropylene to polyolefin films or other synthetic resin products. Therefore, the degree of chlorination of the chlorinated polypropylene is preferably in the range of from 20 to 60, more preferably from 25 to 45.

The modified chlorinated polypropylenes which are specified in the present invention are represented by the above-described general formula [1], and in order to combine the above-described starting materials by the bond group denoted by X in the formula, a functional group for bonding must be introduced into each of the starting materials.

Type I

To obtain a modified chlorinated polypropylene (Type I) which has a bond group represented by

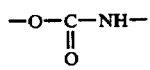

as X in the formula, it is necessary to employ a polyurethane having from 1 to about 1.19 free isocyanate groups in a molecule thereof and a chlorinated polypropylene having at least one hydroxyl group in a molecule thereof.

The polyurethane having a free isocyanate group which is employed to obtain a modified chlorinated polypropylene of Type I may be synthesized by a known process using a mixture of the above-described diol component, diisocyanate component and other compounds which are used according to need, i.e., a chain extender and a reaction terminator, in which the diisocyanate component is added in excess.

On the other hand, a chlorinated polypropylene containing a hydroxyl group which is reacted with the above-described polyurethane containing a free isocyanate group may be obtained by reacting a chlorinated polypropylene with a monomer, oligomer or polymer containing a hydroxyl group and having a radical-reactive unsaturated double bond by a known process.

Examples of monomers containing a hydroxyl group which are usable in the above-described reaction include esters containing a hydroxyl group which are obtained by a reaction of an α,β-unsaturated carboxylic acid such as acrylic acid, methacrylic acid, crotonic acid, isocrotonic acid, maleic acid, fumaric acid, itaconic acid, etc. with any of the above-described diols, and hydroxyl group containing olefin compounds such as allyl alcohol, etc.

Examples of oligomers and polymers containing a hydroxyl group which are usable in the above-described reaction include dimers, trimers and polymers made up of four or more monomer molecules, which are formed by the addition polymerization of the above-described monomers and other vinyl monomers. Examples of said other vinyl monomers are alkyl esters or dialkyl esters obtained by the reaction of the above-described α,β-unsaturated carboxylic acids with various kinds of alcohol.

Examples of other polymers usable in the present invention include polybutadiene having a terminal hydroxyl group and lactone polymers, said lactone polymers being obtained by ring opening polymerization of lactones having 4 or more, preferably 6 or more, carbon atoms in the ring, e.g., ε-caprolactone, γ-valerolactone, γ-butyrolactone, or, any of the above-described lactones which has a substituent group such as an alkyl group or an alkoxyl group, in the presence of an initiator and which have at least one radical-reactive unsaturated double bond in a molecule thereof.

The molecular weight of the lactone polymers used in the present invention is preferably in the range of from 400 to 40,000, more preferably from 2,000 to 20,000. A molecular weight of less than 400 is insufficient to obtain satisfactory compatibility with other resins, whereas if the molecular weight exceeds 40,000, the reactivity with the chlorinated polypropylene is diminished and it is difficult to obtain the target modified chlorinated polypropylene.

According to one preferable method of introducing a radical-reactive unsaturated double bond into the lactone polymers, ring opening polymerization of a lactone is carried out using as an initiator an alkenol such as 3-buten-1-ol or 5-hexen-1-ol, an alkenediol such as 1,4-butenediol or hexenediol, or a polyolefin glycol such as polybutadiene glycol, thereby obtaining desired lactone polymers.

The reaction path of a polyurethane having at least one free isocyanate group in a molecule thereof and a chlorinated polypropylene having at least one hydroxyl group in a molecule thereof may be schematically shown by the following formulae:

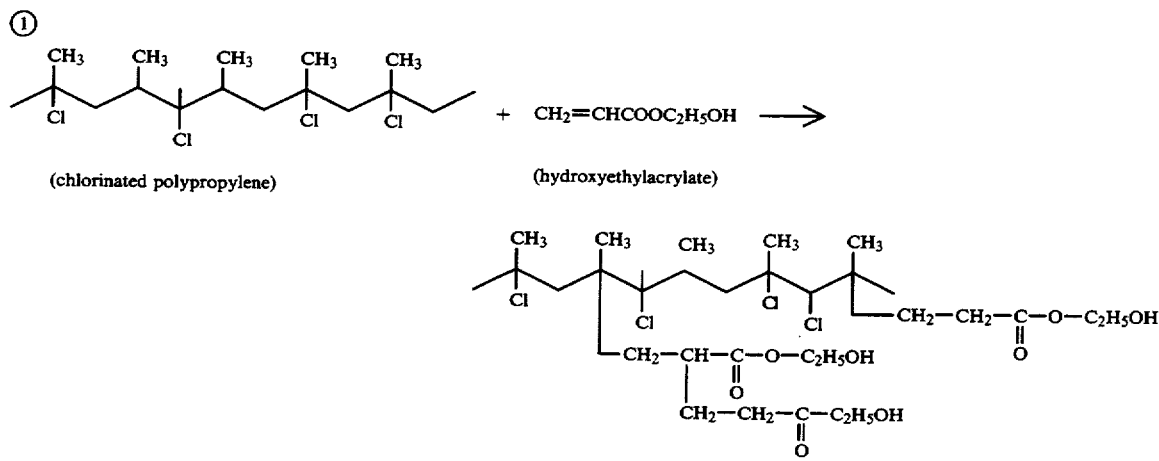

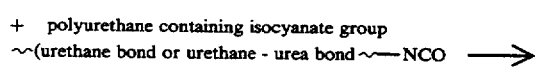

-continued

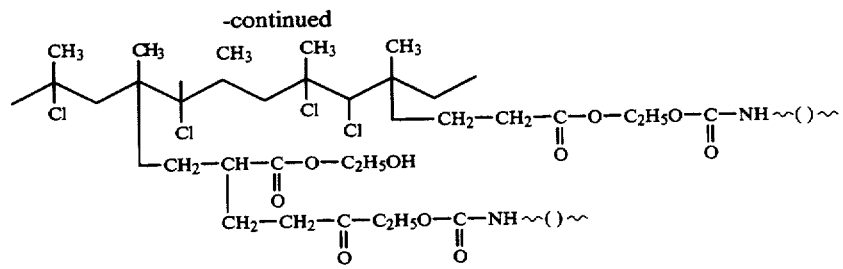

As will be clear from the above, in the modified chlorinated polypropylene of Type I according to the present invention, —NCO of the polyurethane acts on a hydroxyl group as a pendant of the chlorinated polypropylene constituting the main skeleton to form a molecular structure having target functional characteristics.

Type II

To obtain a modified chlorinated polypropylene (Type II) which has a bond group represented by either

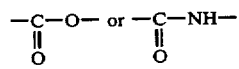

as X, it is necessary to employ a polyurethane having in a molecule thereof from 1 to about 1.17 functional groups from the group consisting of a hydroxyl group, primary and secondary amino groups and a chlorinated polypropylene having at least one acid anhydride group in a molecule thereof.

A polyurethane having a hydroxyl group or a primary or secondary amino group which is employed to obtain a modified chlorinated polypropylene of Type II may be obtained by taking into consideration the proportion of each component when the above-described diol and diisocyanate components are reacted with each other. For example, if the diol component is added in excess relative to the diisocyanate component, a hydroxyl group is introduced. It is also possible to introduce a hydroxyl group by employing the diisocyanate component in excess relative to the diol component and allowing an excess of a diol compound as a chain extender to react with the free isocyanate group. An amino group may be introduced by synthesizing a polyurethane having a free isocyanate group and allowing an excess of diamine serving as a chain extender to react with the resulting polyurethane.

On the other hand, a chlorinated polypropylene having an acid anhydride group may be obtained by carrying out a reaction of a commercially available chlorinated polypropylene with an α,β-unsaturated dibasic acid such as maleic acid or iraconic acid, which can be formed into an acid anhydride, using a known process. It should be noted that when the reaction of the above-described α,β-unsaturated dibasic acid is reacted with a chlorinated polypropylene, the above-described oligomer or polymer formed using the aforementioned other vinyl monomers may be employed.

The reaction path for obtaining a modified chlorinated polypropylene of Type II may be schematically shown by the following formulae:

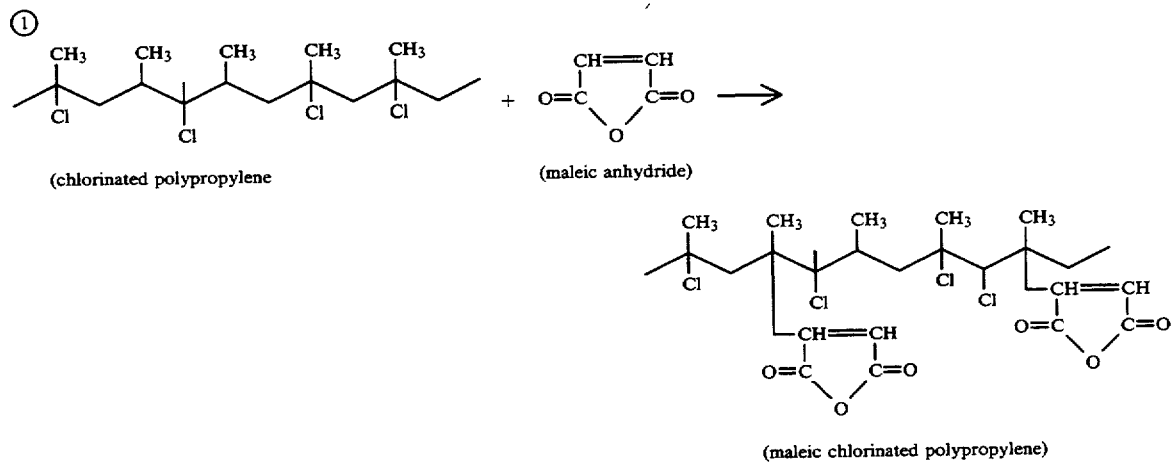

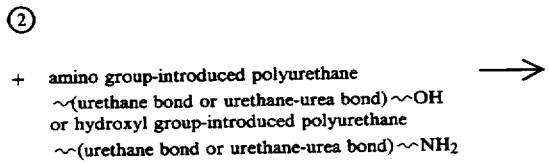

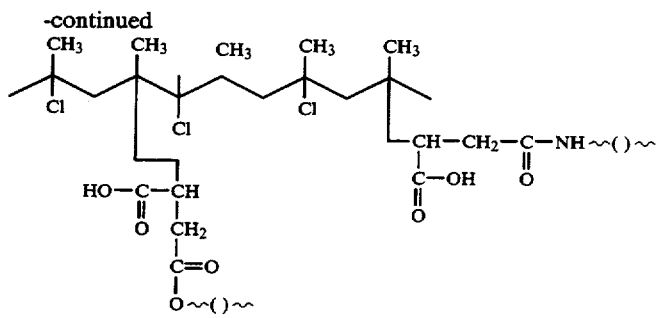

As will be clear from the above, in the modified chlorinated polypropylene of Type II according to the present invention —NH₂ or —OH of the polyurethane acts on an acid anhydride group as a pendant of the chlorinated polypropylene constituting the main skeleton to form a molecular structure having the functional characteristics targeted.

Type III

To obtain a modified chlorinated polypropylene (Type III) which has a bond group represented by either

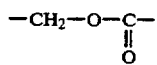

or —CH₂—NH— as X, it is necessary to employ a polyurethane having in a molecule thereof from 1 to about 1.17 functional groups selected from the group consisting of a carboxyl group, primary and secondary amino groups and a chlorinated polypropylene having at least one epoxy group in a molecule thereof.

A polyurethane having a carboxyl group or a primary or secondary amino group which is employed to obtain a modified chlorinated polypropylene of Type III may be obtained by taking into consideration the proportion of each component when the above-described diol and diisocyanate components are reacted with each other and using the following special chain extender or reaction terminator. For example, the above-described polyurethane may be obtained by employing the diisocyanate component in excess relative to the diol component and allowing a chain extender such as a carboxyl group containing diol or a reaction terminator such as an amino carboxylic acid to react with the free isocyanate group. It should be noted that examples of carboxyl group containing diols usable in the present invention are dimethylol propionic acid and an addition product of triol and an acid anhydride in the ratio 1:1, while examples of usable amino carboxyl acids are glycine, alanine and leucine. An amino group may be introduced by synthesizing a polyurethane having a free isocyanate group in the same way as Type II and allowing an excess of diamine serving as a chain extender to react with the resulting polyurethane.

On the other hand, a chlorinated polypropylene having an epoxy group may be obtained by carrying out a reaction of a commercially available chlorinated polypropylene with an epoxy group containing (meth)acrylate such as glycidyl (meth)acrylate or an epoxidized polybutadiene by a known process.

It should be noted that the above-described oligomer or polymer formed using the aforementioned other vinyl monomers may be employed in place of the epoxy group containing vinyl monomer.

The reaction path for obtaining a modified chlorinated polypropylene of Type III may be schematically shown by the following formula:

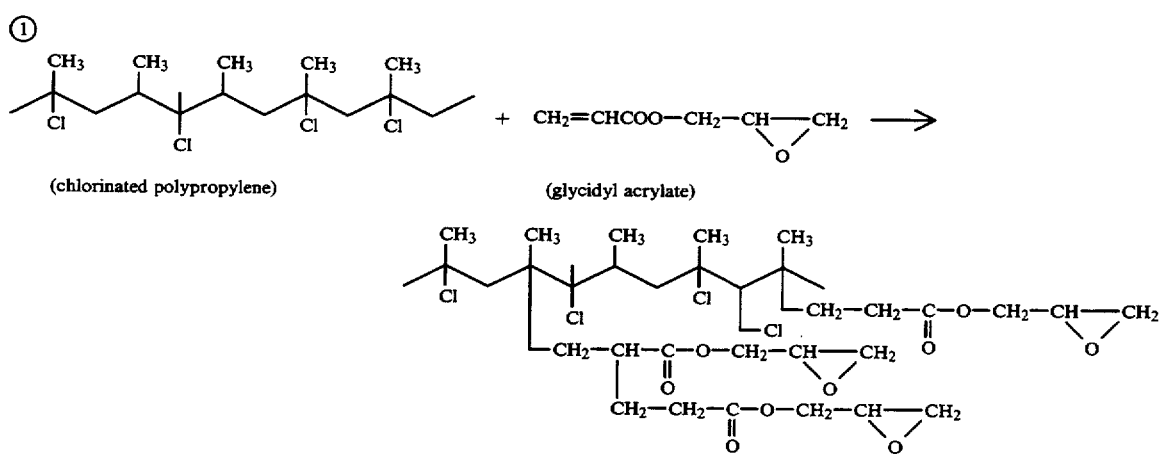

-continued

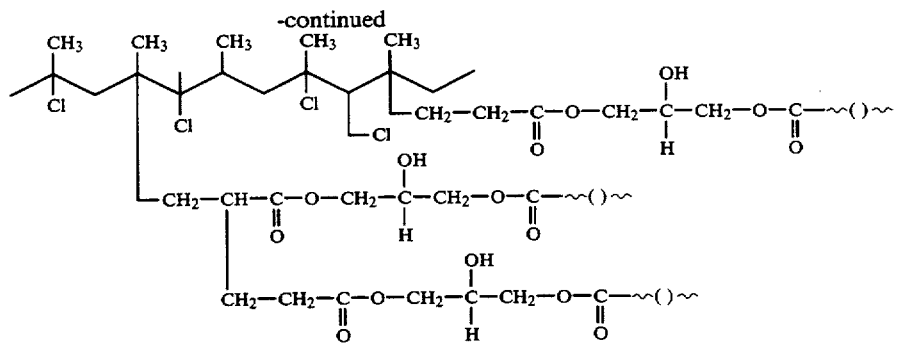

+ polyurethane containing amino group →
~~(urethane bond or urethane-urea bond)~~—NH₂

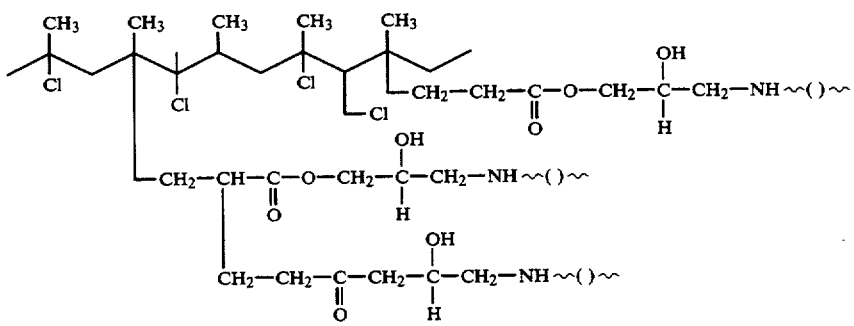

As will be clear from the above, in the modified chlorinated polypropylene of Type III according to the present invention, —NH, —NH₂ or —COOH of the polyurethane acts on an epoxy group as a pendant of the chlorinated polypropylene constituting the main skeleton to form a molecular structure having the functional characteristics aimed for.

Examples of solvents usable to obtain polyurethanes having respective functional groups are aromatic solvents such as benzene, toluene and xylene, ester solvents such as ethyl acetate, propyl acetate and butyl acetate, alcohol solvents such as methanol, ethanol, isopropanol and n-butanol, and ketone solvents such as acetone, methyl ethyl ketone and methyl isobutyl ketone, which are generally used as solvents for printing inks and the like. These solvents may be used alone or in a mixture of two or more. From the viewpoint of occupational safety and healthy, it is most preferable to employ an ester solvent or an alcohol solvent alone or in a mixture.

To obtain a modified chlorinated polypropylene according to the present invention, it is necessary to carry out a reaction of a chlorinated polypropylenes containing a functional group and a polyurethane containing a functional group which are mixed in the weight ratio in the range of from 5/95 to 75/25, more preferably from 15/85 to 50/50. A chlorinated polypropylene content of less than 5% lowers the degree of adhesion of the resulting polymer to polyolefin films, whereas a chlorinated polypropylene content in excess of 75% lowers the degree of adhesion to polyester and nylon films or causes a deterioration in the suitability for boiling and retort applications.

To manufacture a printing ink or a coating that uses a modified chlorinated polypropylene obtained in this way, various kinds of pigment are added together with any of the aforementioned solvents to the modified chlorinated polypropylene and the mixture is ground and dispersed. If necessary, it is possible to jointly use additives such as an anti-blocking agent and a plasticizer, or a resin having compatibility with the modified chlorinated polypropylene of the present invention, selected from the group consisting of nitrocellulose, chlorinated polyolefins such as a chlorinated polyethylene, a chlorinated polypropylene and a chlorinated ethylene-propylene copolymer, chlorosulfonated polyolefins, ethylene-vinyl acetate copolymer, chlorinated or chlorosulfonated ethylene-vinyl acetate copolymer, maleic resins, and vinyl chloride-acetate copolymer.

Hereinunder, the present invention will be described more specifically by way of examples. However, the present invention is in no way restricted by these examples.

Example of Synthesis of Polyurethane 1

Polyurethane containing free NCO

In a four-necked flask equipped with a stirrer, a thermometer, a Dimroth condenser and a nitrogen gas inlet pipe were charged with 44.4 parts of isophorone diisocyanate and 200 parts of a polyesterdiol having a molecular weight of 2,000 synthesized from adipic acid and 1,4-butanediol and the resulting reaction was allowed to proceed for several hours with nitrogen gas being introduced into the system. After 4.5 parts of 1,4-butanediol had also been charged into the system, the reaction was allowed to proceed for a further several hours. After cooling, 151 parts of toluene and 101 parts of methyl ethyl ketone were added. Thereafter, 2.92 parts of n- butylamine were added to terminate the reaction, thus obtaining a polyurethane resin solution (1).

Example of Synthesis of Polyurethane 2

Polyurethane containing free OH group

Into the same apparatus as in Synthesis Example 1 were char9ed 44.4 parts of isophorone diisocyanate and 200 parts of a polyesterdiol having a molecular weight of 2,000 synthesized from adipic acid and 1,4-butanediol and the resulting reaction was allowed to proceed for several hours with nitrogen gas being introduced into the system. After 4.5 parts of 1,4-butanediol has also been charged into the system, the reaction was allowed to proceed for a further several hours. After cooling, 153 parts of toluene and 102 parts of methyl ethyl ketone were added. Thereafter, 2.92 parts of n-butylamine and 3.66 parts of monoethanolamine were added to terminate the reaction, thus obtaining a polyurethane resin solution (2).

Example of Synthesis of Polyurethane 3

Polyurethane containing free amino group

Into the same apparatus as in Synthesis Example 1 were charged 200 parts of polybutylene adipatediol having a molecular weight of 2,000, 44.4 parts of isophorone diisocyanate, 4.5 parts of 1,4-butanediol, 2.92 parts of n-butylamine, 3.6 parts of ethylenediamine, 154 parts of toluene and 103 parts of methyl ethyl ketone and the resulting reaction was allowed to proceed in the same way as in Synthesis Example 1 to thereby obtain a polyurethane resin solution (3).

Example of Synthesis of Polyurethane 4

Polyurethane containing free COOH group

Into the same apparatus as in Synthesis Example 1 were charged 44.4 parts of isophorone diisocyanate and 200 parts of a polyesterdiol having a molecular weight of 2,000 synthesized from adipic acid and 1,4-butanediol and the resulting reaction was allowed to proceed for several hours with nitrogen gas being introduced into the system. Then 6.7 parts of dimethylol propionic acid was additionally charged into the system and the reaction was allowed to proceed for a further several hours. After cooling, 155 parts of toluene and 103 parts of methyl ethyl ketone were added. Thereafter, 7.3 parts of n-butylamine were added to terminate the reaction, thus obtaining a polyurethane resin solution (4).

Example of Synthesis of Polyurethane 5

Polyurethane containing no functional group

Into the same apparatus as in Synthesis Example 1 were charged 200 parts of polybutylene adipatediol having a molecular weight of 2,000, 44.4 parts of isophorone diisocyanate, 4.5 parts of 1,4-butanediol, 7.3 parts of n-butylamine, 154 parts of toluene and 102 parts of methyl ethyl ketone and the resulting reaction was allowed to proceed in the same way as in Synthesis Example 1 to thereby obtain a polyurethane resin solution (5).

Example of Synthesis of Lactone Polymer Adduct

Into a four-necked flask equipped with a Stirrer, a thermometer, a Dimroth condenser and a nitrogen gas inlet pipe were charged 400 parts by weight of ε-caprolactone, 44.4 parts by weight of 1,4-butanediol and 400 ppm of tetrabutyl titanate and the resulting reaction was allowed to proceed for 10 hours at 170° to 180° C., thereby obtaining a lactone polymer having a molecular weight of 8,000. Then, 1,000 parts by weight of a 30% toluene solution of a chlorinated polypropylene (molecular weight: 20,000; the degree of chlorination: 27), 75 parts by weight of the lactone polymer obtained as described above and 3 parts by weight of benzoyl peroxide were charged into the other flask and the reaction was allowed to continue for 2 more hours at 90° C. With one part by weight of the above-described benzoyl peroxide being added every two hours, the reaction was allowed to proceed for a further 4 hours to obtain a chlorinated polypropylene having a lactone polymer added thereto (the ratio of chlorinated polypropylene to lactone polymer: 80:20).

EXAMPLE 1

Using a four-necked flask equipped with a stirrer, a thermometer, a Dimroth condenser and a nitrogen gas inlet pipe, 500 parts of the polyurethane resin solution (1) obtained as described above and 210 parts of a 30% toluene solution of a hydroxyl group containing chlorinated polypropylene resin [the degree of chlorination: 27.7; hydroxyethylacrylate (HEA): 12wt %] were mixed and allowed to react with each other for 6 hours at 90° C. After cooling, 68 parts of toluene and 265 parts of methyl ethyl ketone were added to obtain a target modified chlorinated polypropylene resin solution (I-A). The weight ratio of polyurethane (PU) to chlorinated polypropylene (Cl-PP) in the resulting resin was PU/Cl-PP=80/20.

EXAMPLES 2 TO 7

With the same reaction conditions as in Example 1, resin solutions I-B to I-G were obtained having the following various compositions.

It should be noted that in these Examples a 30% resin toluene solution was used as a chlorinated polypropylene resin.

| Resin Solution I-B (Example 2) | |
|---|---|
| Polyurethane resin solution (1) | 500 parts |
| Hydroxyl group containing chlorinated polypropylene (chlorination degree: 27.7; HEA: 12 wt %) | 833 parts |
| Toluene | 84 parts |
| Methyl ethyl ketone | 250 parts |
| PU/Cl-PP = 50/50 | |
| Resin Solution I-C (Example 3) | |
| Polyurethane resin solution (1) | 500 parts |
| Hydroxyl group containing chlorinated polypropylene (chlorination degree: 34; HEA: 12 wt %) | 210 parts |
| Toluene | 68 parts |
| Methyl ethyl ketone | 265 parts |
| PU/Cl-PP = 80/20 | |
| Resin Solution I-D (Example 4) | |
| Polyurethane resin solution (1) | 500 parts |
| Hydroxyl group containing chlorinated polypropylene {chlorination degree: 27.7; polybutadiene glycol (MW 2,000) 10 wt %} | 357 parts |
| Toluene | 16 parts |
| Methyl ethyl ketone | 317 parts |
| PU/Cl-PP = 70/30 | |
| Resin Solution I-E (Example 5) | |
| Polyurethane resin solution (1) | 500 parts |
| Hydroxyl group containing chlorinated polypropylene {chlorination degree: 34; polybutadiene glycol (MW 2,000) 12 wt %} | 357 parts |
| Toluene | 16 parts |

| -continued | |
|---|---|
| Methyl ethyl ketone | 317 parts |
| PU/Cl-PP = 70/30 | |
| Resin Solution I-F (Example 6) | |
| Polyurethane resin solution (1) | 500 parts |
| Hydroxyl group containing chlorinated polypropylene {chlorination degree: 45; polybutadiene (MW 2,000) 12 wt %} | 357 parts |
| Toluene | 16 parts |
| Methyl ethyl ketone | 317 parts |
| PU/Cl-PP = 70/30 | |
| Resin Solution I-G (Example 7) | |
| Polyurethane resin solution (1) | 400 parts |
| Hydroxyl group containing chlorinated polypropylene (chlorination degree: 60; HEA: 12 wt %) | 545 parts |
| Toluene | 8 parts |
| Methyl ethyl ketone | 260 parts |
| PU/Cl-PP = 55/45 | |

Resin Solution I-H (Comparative Example 1)

A resin solution I-H was obtained using materials mixed in the following proportions under the same reaction conditions as in Example 1. It should be noted that Comparative Example 1 shows a case where the weight ratio of chlorinated polypropylene to polyurethane is relatively high.

| | |
|---|---|
| Polyurethane resin solution (1) | 100 parts |
| Hydroxyl group containing chlorinated polypropylene (chlorination degree: 27.7; HEA: 12 wt %) | 400 parts |
| Toluene | 65 parts |
| Methyl ethyl ketone | 317 parts |
| PU/Cl-PP = 20/80 | |

Evaluation Test 1

Thirty parts of each of the resin solutions I-A to I-H obtained in Examples 1 to 7 and Comparative Example 1 were mixed with 25 parts of isopropyl alcohol and either a mixture of 30 parts of titanium oxide and 20 parts of ethyl acetate (in the case of white ink) or a mixture of 10 parts of cyanin blue pigment and 35 parts of ethyl acetate (in the case of blue ink). The resulting mixtures were ground to obtain samples of these several types of printing ink.

For each of the printing inks thus obtained, the degree of adhesion to various kinds of film, pigment dispersibility, utility for lamination and suitability for boiling and retort applications were evaluated. The results are shown in Table 2.

Evaluation was made using the following methods:

1) Adhesion

Printing of a predetermined film was performed on each of the test inks with a gravure proof press and the printed film was allowed to stand for one day. Thereafter, a piece of adhesive cellophane tape was stuck to the printed surface and then peeled rapidly off. In cases where none of the printed ink film was peeled off with the tape, the superior performance of the test ink concerned is indicated by the symbol ⊙, while the symbols o, Δ and x indicate that 80% or more, from 50 to 80%, and 20% or less of the ink film was left on the base film respectively.

2) Pigment Dispersibility

The color development, transparency and density of each test ink on printed matter were evaluated. Test inks exhibiting the most excellent pigment dispersibility are given the symbol ⊙; those exhibiting practicable pigment dispersibility allowing printing to be carried out without any serious problem are indicated by o; those without sufficient pigment dispersibility by Δ; and those lacking practicable pigment dispersibility by x.

3) Extrusion Laminating Strength

Molten polyethylene was laminated on each printed matter with an extrusion laminating machine using an imine anchor coat material for oriented polypropylene (OPP) and an isocyanate anchor coat material for polyethylene terephthalate (PET) or nylon (NY). Three days later, each sample was cut into a piece 15 mm wide, and the T-type peel strength of each sample was measured with a peel tester (manufactured by Yasuda Seiki).

4) Dry Laminating Strength

A CPP (non-oriented polypropylene) film was laminated on each printed surface with a dry laminating machine using a urethane adhesive. Three days later, the peel strength of each sample was measured in the same way as in the measurement of the extrusion laminating strength.

5) Boiling and Retort Performance

After completion of the laminating process., each printed article was formed into a bag, and a mixture of water and oil was put into each bag. After being hermetically sealed, each bag was heated for 30 minutes at 90° C. to examine the effects of boiling and, at 120° C., retort. Thereafter, judgement as to whether or not each sample suffered any delamination was made by inspecting the external appearance. Samples showing no signs of delamination are indicated by the symbol o; those displaying pinhole-shaped delamination by Δ; and those displaying delamination all over the surface by x.

6) Suitability for PP Direct Lamination

Molten polypropylene was directly laminated on each sample of OPP printed matter with an extrusion laminating machine. Two days later, the peel strength of each sample was measured in the same way as in the measurement of the extrusion laminating strength.

Evaluation Test 2

Resin solutions I-I to I-M consisting of the following mixtures were prepared for Examples 8 and 9 and Comparative Examples 2 to 4, and the respective stabilities of the resin solutions were evaluated. The results of the evaluation are shown in Table 1. Resin solutions that remained stable without separation or gelation even after 5 days had elapsed following preparation are indicated by the symbol o, while those failing to do so are indicated by x. It should be noted that the results of Evaluation Test 1 for the resin solutions I-I, I-J, I-M and a polyurethane resin solution (5) (Comparative Example 5) are also shown in Table 2.

| Resin Solution I-I (Example 8) | |
|---|---|
| Polyurethane resin solution (2) | 500 parts |
| Resin solution I-B | 833 parts |
| Toluene | 84 parts |
| Methyl ethyl ketone | 250 parts |
| PU/Cl-PP = 75/25 | |
| Resin Solution I-J (Example 9) | |
| Polyurethane resin solution (2) | 500 parts |
| Resin solution I-B | 624 parts |
| Chlorinated polypropylene (Chlorination degree: 30; 30% toluene solution) | 208 parts |
| PU/Cl-PP = 70/30 | |
| Resin Solution I-K (Comparative Example 2) | |
| Polyurethane resin solution (2) | 500 parts |

-continued (terminal alkyl)
Chlorinated polypropylene (Chlorination  833 parts
degree: 30; 30% toluene solution)
Toluene  84 parts
Methyl ethyl ketone  250 parts
PU/Cl-PP = 50/50
Resin Solution I-L (Comparative Example 3)
Polyurethane resin solution (2)  500 parts
Hydroxyl group containing chlorinated  357 parts
polypropylene (Chlorination degree: 27.7;
HEA: 12 wt %)
Toluene  183 parts
Methyl ethyl ketone  150 parts
PU/Cl-PP = 70/30
Resin Solution I-M (Comparative Example 4)
Chlorinated polypropylene  7.5 parts
(Chlorination degree: 29.5)
Chlorinated ethylene-vinyl acetate  22.5 parts
copolymer (vinyl acetate: 9 mol %;
chlorination degree: 27)
Toluene  56 parts
Methyl ethyl ketone  17 parts

TABLE 1

| Resin solutions | I-I | I-J | I-K | I-L |
|---|---|---|---|---|
| Stability | ○ | ○ | x | x |

TABLE 2

| | | Example 1 | | Example 2 | | Example 3 | | Example 4 | | Example 5 | | Example 6 | |
|---|---|---|---|---|---|---|---|---|---|---|---|---|---|
| | | \multicolumn{12}{c}{Resin solutions} |
| | | I-A | | I-B | | I-C | | I-D | | I-E | | I-F | |
| | | \multicolumn{12}{c}{Color of ink} |
| Properties | Film | White | Blue | White | Blue | White | Blue | White | Blue | White | Blue | White | Blue |
| Adhesion | OPP | ○ | ⊚ | ○ | ○ | ○ | ○ | ○ | □ | ○ | ⊚ | ○ | ○ |
| | PET | ⊚ | ⊚ | ⊚ | ⊚ | ⊚ | ⊚ | ⊚ | ⊚ | ⊚ | ⊚ | ⊚ | ⊚ |
| | NY | ⊚ | ⊚ | ⊚ | ⊚ | ⊚ | ⊚ | ⊚ | ⊚ | ⊚ | ⊚ | ⊚ | ⊚ |
| Pigment dispersibility | | — | ⊚ | — | ⊚ | — | ⊚ | — | ○ | — | ⊚ | — | ○ |
| Extrusion laminating strength g/15 mm | OPP | 150 | 90 | 150 | 90 | 180 | 100 | 80 | 80 | 150 | 80 | 100 | 70 |
| | PET | 300 | 300 | 200 | 200 | 200 | 200 | 200 | 200 | 300 | 300 | 200 | 200 |
| | NY | >300 | >300 | >300 | >300 | >300 | >300 | >300 | >300 | >300 | >300 | >300 | >300 |
| Dry laminating strength g/15 mm | OPP | 200 | 200 | 250 | 200 | 200 | 150 | 250 | 150 | 200 | 200 | 200 | 150 |
| | PET | >300 | >300 | >300 | >300 | >300 | >300 | >300 | >300 | >300 | >300 | >300 | >300 |
| | NY | >300 | >300 | >300 | >300 | >300 | >300 | >300 | >300 | >300 | >300 | >300 | >300 |
| Boiling performance | NY | ○ | ○ | ○ | ○ | ○ | ○ | ○ | ○ | ○ | ○ | ○ | ○ |
| Retort performance | NY | ○ | ○ | — | — | ○ | ○ | — | — | ○ | ○ | Δ | Δ |
| PP direct laminating strength | OPP | 100 | 80 | 100 | 90 | 150 | 100 | 120 | 90 | 150 | 100 | 100 | 60 |

| | | Example 7 | | Comp. Ex. 1 | | Example 8 | | Example 9 | | Comp. Ex. 4 | | Compalative Example 5 | |
|---|---|---|---|---|---|---|---|---|---|---|---|---|---|
| | | \multicolumn{10}{c}{Resin solutions} | Polyurethane resin solution (5) | |
| | | I-G | | I-H | | I-I | | I-J | | I-M | | | |
| | | \multicolumn{12}{c}{Color of ink} |
| Properties | Film | White | Blue | White | Blue | White | Blue | White | Blue | White | Blue | White | Blue |
| Adhesion | OPP | ○ | ○ | x | x | ○ | ○ | ○ | ○ | ○ | ○ | x | x |
| | PET | ○ | ○ | Δ | Δ | ⊚ | ⊚ | ⊚ | ⊚ | Δ | Δ | ○ | ○ |
| | NY | ○ | ○ | Δ | Δ | ⊚ | ⊚ | ⊚ | ⊚ | Δ | Δ | ○ | ○ |
| Pigment dispersibility | | — | ⊚ | — | Δ | — | ⊚ | — | ⊚ | — | ○ | — | ○ |
| Extrusion laminating strength g/15 mm | OPP | 80 | 60 | 100 | 80 | 100 | 70 | 150 | 100 | 100 | 80 | 30 | 20 |
| | PET | 150 | 100 | 100 | 100 | 200 | 200 | 200 | 200 | 40 | 30 | 300 | 300 |
| | NY | >300 | >300 | >100 | >150 | >300 | >300 | >300 | >300 | 100 | 50 | 300 | 300 |
| Dry laminating strength g/15 mm | OPP | 200 | 150 | 150 | 150 | 250 | 200 | 250 | 200 | 150 | 150 | 150 | 150 |
| | PET | >300 | >300 | 50 | 30 | >300 | >300 | >300 | >300 | 30 | 30 | 300 | 300 |
| | NY | >300 | >300 | 50 | 50 | >300 | >300 | >300 | >300 | 50 | 50 | 300 | 300 |
| Boiling performance | NY | ○ | ○ | Δ | Δ | ○ | ○ | ○ | ○ | x | x | ○ | ○ |
| Retort performance | NY | Δ | — | x | x | — | — | — | — | x | x | ○ | ○ |
| PP direct laminating strength | OPP | 100 | 60 | 120 | 100 | 100 | 80 | 150 | 100 | 100 | 70 | 10 | 5 |

EXAMPLE 10

Using a four-necked flask equipped with a stirrer, a thermometer, a Dimroth condenser and a nitrogen gas inlet pipe, 500 parts of the polyurethane resin solution (1) obtained as described above and 210 parts of the lactone polymer-added chlorinated polypropylene (obtained in Example of Synthesis of Lactone Polymer Adduct) were mixed and allowed to react with each other for 6 hours at 90° C. After cooling, 68 parts of toluene and 265 parts of methyl ethyl ketone were added to obtain a target modified chlorinated polypropylene resin solution (I-N). The weight ratio of polyurethane (PU) to chlorinated polypropylene (Cl-PP) in the resulting resin was PU/Cl-PP≈80/20.

EXAMPLE 11

Using the same apparatus as in Example 10, 500 parts of the polyurethane resin solution (2) obtained in Synthesis Example 2 and 210 parts of a 30% toluene solution of a maleic modified chlorinated polypropylene resin (the degree of chlorination: 27.7; maleic anhydride: 1.2/molecule) were mixed and allowed to react with each other for 6 hours at 90° C. After cooling, 68 parts of toluene and 265 parts of methyl ethyl ketone were added to obtain a target modified chlorinated polypropylene resin solution (II-A). The weight ratio of polyurethane (PU) to chlorinated polypropylene (Cl-PP) in the resulting resin was PU/Cl-PP≈80/20.

EXAMPLES 12 TO 14

With the same reaction conditions as in Example 10, resin solutions II-B to II-D were obtained according to the following compositions.

It should be noted that in these Examples a 30% resin toluene solution was used as a chlorinated polypropylene resin.

| Resin Solution II-B (Example 12) | |
|---|---|
| Polyurethane resin solution (2) | 500 parts |
| Maleic modified chlorinated polypropylene (chlorination degree: 34; maleic anhydride: 11.2/molecule) | 210 parts |
| Toluene | 68 parts |
| Methyl ethyl ketone | 265 parts |
| PU/Cl-PP = 80/20 | |
| Resin Solution II-C (Example 13) | |
| Polyurethane resin solution (3) | 500 parts |
| Maleic modified chlorinated polypropylene (chlorination degree: 34; maleic anhydride: 1.2/molecule) | 357 parts |
| Toluene | 16 parts |
| Methyl ethyl ketone | 317 parts |
| PU/Cl-PP = 70/30 | |
| Resin Solution II-D (Example 14) | |
| Polyurethane resin solution (3) | 500 parts |
| Maleic modified chlorinated polypropylene (chlorination degree: 45; maleic anhydride: 1.2/molecule) | 357 parts |
| Toluene | 16 parts |
| Methyl ethyl ketone | 317 parts |
| PU/Cl-PP = 70/30 | |

EXAMPLE 15

Using the same apparatus as in Example 10, 500 parts of polyurethane resin solution (4) obtained in Synthesis Example 4 and 210 parts of a 30% toluene solution of an epoxidized chlorinated polypropylene resin (the degree of chlorination: 27.7; epoxy group: 1.2/molecule) were mixed and allowed to react with each other for 6 hours at 90° C. After cooling, 68 parts of toluene and 265 parts of methyl ethyl ketone were added to obtain a target modified chlorinated polypropylene resin solution III-A. The weight ratio of polyurethane (PU) to chlorinated polypropylene (Cl-PP) in the resulting resin was PU/Cl-PP≈80/20.

EXAMPLES 16 TO 19

Using the same reaction conditions as in Example 15, resin solutions III-B to III-E were obtained having the following various compositions.

It should be noted that in these Examples a 30% resin toluene solution was used as a chlorinated polypropylene resin.

| Resin Solution III-B (Example 16) | |
|---|---|
| Polyurethane resin solution (4) | 500 parts |
| Epoxidizedd chlorinated polypropylene (chlorination degree: 34; epoxy group: 11.2/molecule) | 210 parts |
| Toluene | 68 parts |
| Methyl ethyl ketone | 265 parts |
| PU/Cl-PP = 80/20 | |
| Resin Solution III-C (Example 17) | |
| Polyurethane resin solution (3) | 500 parts |
| Epoxidized chlorinated polypropylene (chlorination degree: 34; epoxy group: 1.2/molecule) | 357 parts |
| Toluene | 16 parts |
| Methyl ethyl ketone | 317 parts |
| PU/Cl-PP = 70/30 | |
| Resin Solution III-D (Example 18) | |
| Polyurethane resin solution (3) | 500 parts |
| Epoxidized chlorinated polypropylene (chlorination degree: 45; epoxy group: 1.2/molecule) | 357 parts |
| Toluene | 16 parts |
| Methyl ethyl ketone | 317 parts |
| PU/Cl-PP = 70/30 | |
| Resin Solution III-E (Example 19) | |
| Polyurethane resin solution (3) | 400 parts |
| Epoxidized chlorinated polypropylene (chlorination degree: 60; epoxy group: 1.2/molecule) | 545 parts |
| Toluene | 8 parts |
| Methyl ethyl ketone | 260 parts |
| PU/Cl-PP = 55/45 | |

Evaluation Test 3

Thirty parts of each of the resin solutions I-N, II-A to II-D and III-A to III-E obtained in Examples 10 to 19, 25 parts of isopropyl alcohol were mixed with either a mixture of 30 parts of titanium oxide and 20 parts of ethyl acetate (in the case of white ink) or a mixture of 10 parts of cyanin blue pigment and 35 parts of ethyl acetate (in the case of blue ink), and the mixture was ground to obtain samples of several tapes of printing ink.

For each of the printing inks thus obtained, the degree of adhesion to various kinds of film, pigment dispersibility, utility for lamination, and suitability for boiling and retort applications were evaluated in the same way as in Evaluation Test 1. The results are shown in Table 3.

TABLE 3

| | | Example 1 | | Example 10 | | Example 11 | | Example 12 | | Example 13 | | Example 14 | |
|---|---|---|---|---|---|---|---|---|---|---|---|---|---|
| | | Resin solutions | | | | | | | | | | | |
| | | I-A | | I-N | | II-A | | II-B | | II-C | | II-D | |
| | | Color of ink | | | | | | | | | | | |
| Properties | Film | White | Blue | White | Blue | White | Blue | White | Blue | White | Blue | White | Blue |
| Adhesion | OPP | ○ | ⊙ | ○ | ⊙ | ○ | ⊙ | ○ | ○ | ○ | ⊙ | ○ | ○ |

TABLE 3-continued

| | | | | | | | | | | | | | |
|---|---|---|---|---|---|---|---|---|---|---|---|---|---|
| | PET | ⊙ | ⊙ | ⊙ | ⊙ | ⊙ | ⊙ | ⊙ | ⊙ | ⊙ | ⊙ | ⊙ | ⊙ |
| | NY | ⊙ | ⊙ | ⊙ | ⊙ | ⊙ | ⊙ | ⊙ | ⊙ | ⊙ | ⊙ | ⊙ | ⊙ |
| Pigment dispersibility | | — | ⊙ | — | ⊙ | — | ⊙ | — | ⊙ | — | ⊙ | — | o |
| Extrusion laminating strength g/15 mm | OPP | 150 | 90 | 150 | 90 | 150 | 90 | 180 | 100 | 150 | 80 | 100 | 70 |
| | PET | 300 | 300 | 300 | 300 | 300 | 300 | 200 | 200 | 300 | 300 | 200 | 200 |
| | NY | >300 | >300 | >300 | >300 | >300 | >300 | >300 | >300 | >300 | >300 | >300 | >300 |
| Dry laminating strength g/15 mm | OPP | 200 | 200 | 250 | 200 | 200 | 200 | 200 | 150 | 200 | 200 | 200 | 150 |
| | PET | >300 | >300 | >300 | >300 | >300 | >300 | >300 | >300 | >300 | >300 | >300 | >300 |
| | NY | >300 | >300 | >300 | >300 | >300 | >300 | >300 | >300 | >300 | >300 | >300 | >300 |
| Boiling performance | NY | o | o | o | o | o | o | o | o | o | o | o | o |
| Retort performance | NY | o | o | — | — | o | o | o | o | o | o | Δ | Δ |
| PP direct laminating strength | OPP | 100 | 80 | 120 | 100 | 100 | 80 | 150 | 100 | 150 | 100 | 100 | 60 |

| | | Example 15 | | Example 16 | | Example 17 | | Example 18 | | Example 19 | |
|---|---|---|---|---|---|---|---|---|---|---|---|
| | | Resin solutions | | | | | | | | | |
| | | III-A | | III-B | | III-C | | III-D | | III-E | |
| | | color of ink | | | | | | | | | |
| Properties | Film | White | Blue | White | Blue | White | Blue | White | Blue | White | Blue |
| Adhesion | OPP | o | ⊙ | o | o | o | ⊙ | o | o | o | o |
| | PET | ⊙ | ⊙ | ⊙ | ⊙ | ⊙ | ⊙ | ⊙ | ⊙ | o | o |
| | NY | ⊙ | ⊙ | ⊙ | ⊙ | ⊙ | ⊙ | ⊙ | ⊙ | o | o |
| Pigment dispersibility | | — | ⊙ | — | ⊙ | — | ⊙ | — | o | — | ⊙ |
| Extrusion laminating strength g/15 mm | OPP | 150 | 90 | 180 | 100 | 150 | 80 | 100 | 70 | 80 | 60 |
| | PET | 300 | 300 | 200 | 200 | 300 | 300 | 200 | 200 | 150 | 100 |
| | NY | >300 | >300 | >300 | >300 | >300 | >300 | >300 | >300 | >300 | >300 |
| Dry laminating strength g/15 mm | OPP | 200 | 200 | 200 | 150 | 200 | 200 | 200 | 150 | 200 | 150 |
| | PET | >300 | >300 | >300 | >300 | >300 | >300 | >300 | >300 | >300 | >300 |
| | NY | >300 | >300 | >300 | >300 | >300 | >300 | >300 | >300 | >300 | >300 |
| Boiling performance | NY | o | o | o | o | o | o | o | o | o | o |
| Retort performance | NY | o | o | o | o | o | o | Δ | Δ | Δ | — |
| PP direct laminating strength | OPP | 100 | 80 | 150 | 100 | 150 | 100 | 100 | 60 | 100 | 60 |

As will be obvious from these Examples, the modified chlorinated polypropylenes according to the present invention are useful as binder resins for printing inks and have excellent characteristics. They are particularly superior in terms of: 1) adhesion to a wide range of plastic films including polyolefin films, polyester films and nylon films; 2) pigment dispersibility; 3) storage stability; 4) utility for lamination, particularly with respect to polypropylene direct lamination; and 5) suitability for processing in such after-treatments as boiling and retort processes.

Since the modified chlorinated polypropylenes according to the present invention have excellent adhesion to various kinds of plastic material, they can also be applied in the form of other coatings such as adhesives and paints for decorating and protecting a wide variety of synthetic resin molded products, for example, synthetic leather and automotive bumpers, etc.

What is claimed is:

1. A coating composition for a plastic film, plastic sheet or synthetic resin molded product, comprising:
   (A) a modified chlorinated polypropylene selected from the following reaction products,
      (a) a reaction product, shown by the following formula (1) produced by reacting 5-75 weight parts of a reactant chlorinated polypropylene having a molecular weight in the range of 5,000 to 500,000 and a degree of chlorination in the range of from 20 to 60, and having at least one hydroxyl group with 25-95 weight parts of a polyurethane having a molecular weight in the range of from 1,000 to 150,000 and having in a molecule thereof 1 to about 1.19 free isocyanate groups, said reactant chlorinated polypropylene being obtained by reacting a chlorinated polypropylene with a vinyl monomer containing a hydroxy group which is obtained by a reaction of an α, β-unsaturated carboxylic acid and a diol, or with 1,4-butene glycol, said diol being selected from the group consisting of ethylene glycol, diethylene glycol, propyleneglycol, 1,4-butanediol, neopentyl glycol and 1,6-hexanediol, or said reactant chlorinated polypropylene being obtained by reacting a chlorinated polypropylene with a polymer formed by the addition polymerization of said vinyl monomer containing a hydroxy group and another vinyl monomer selected from the group consisting of alkyl esters and dialkyl esters of the α,β-unsaturated carboxylic acid, or said reactant chlorinated polypropylene being obtained by reacting a chlorinated polypropylene with a lactone polymer formed by the ring opening polymerization of lactones in the presence of an initiator selected from the group consisting of 3-butene-1-ol, 5-hexene-1-ol, 1,4-butenediol, hexenediol and polybutadiene glycol,

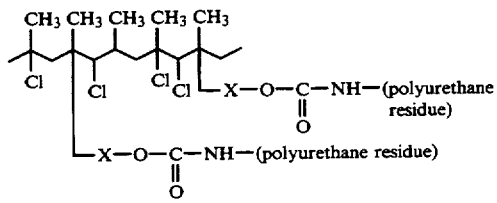

wherein X is the residue of said vinyl monomer, said polymer or said lactone polymer, (b) a reaction product shown by the following formulas (2)-1 and (2)-2 produced by reacting 5-75 weight parts of a reactant chlorinated polypropylene having a molecular weight in the range of from 5,000 to 500,000 and a degree of chlorination in the range of from 20 to 60, and having at least one anhydride group with 25-95 weight parts of a polyurethane having a molecular weight in the range of from 1,000 to 150,000 and having in a molecule thereof 1 to about 1.17 hydroxy groups, or primary amino groups, said reactant chlorinated polypropylene being obtained by reacting a chlorinated polypropylene with an anhydride of an α, β-unsaturated dibasic acid,

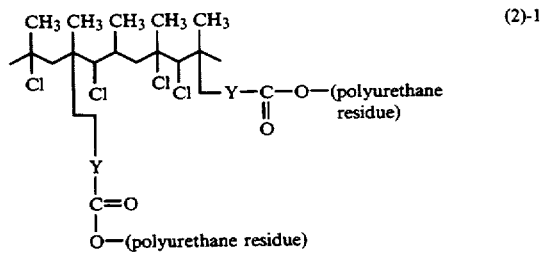

or

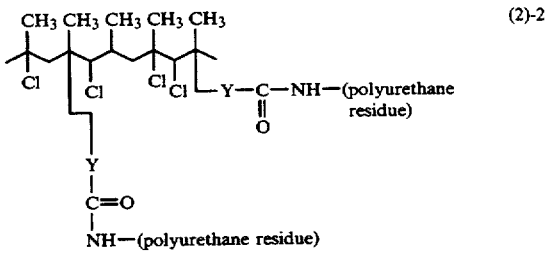

wherein Y is the residue of said anhydride of an α, β-unsaturated dibasic acid, (c) a reaction product, shown by the following formulas (3)-1 and (3)-2 produced by reacting 5-75 weight parts of a reactant chlorinated polypropylene having a molecular weight in the range of 5,000 to 500,000 and a degree of chlorination in the range of from 20 to 60, and having at least one epoxy group with 25-95 weight parts of a polyurethane having a molecular weight in the range of from 1,000 to 150,000 and having in a molecule thereof 1 to about 1.17 carboxyl groups, or primary amino groups, said reactant chlorinated polypropylene being obtained by reacting a chlorinated polypropylene with an epoxy group containing (meth)acrylate or an epoxidized polybutadiene,

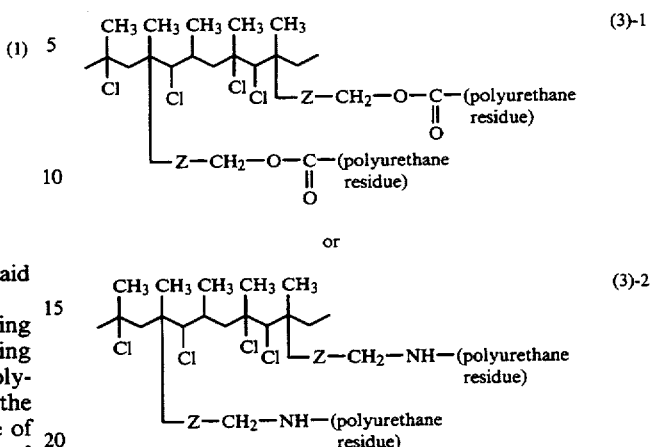

wherein Z is the residue of said (meth)acrylate or said epoxidized polybutadiene.

(B) a pigment and (C) a solvent.

2. A coating composition which is an adhesive composition for a plastic film, plastic sheet or synthetic resin molded product, comprising:

(A) a modified chlorinated polypropylene selected from the following reaction products as a principal binder resin;

(a) a reaction product, shown by the following formula (1) produced by reacting 5-75 weight parts of a reactant chlorinated polypropylene having a molecular weight in the range of from 5,000 to 500,000 and a degree of chlorination in the range of from 20 to 60, and having at least one hydroxyl group with 25-95 weight parts of a polyurethane having a molecular weight in the range of from 1,000 to 150,000 and having in a molecule thereof 1 to about 1.19 free isocyanate groups, said reactant chlorinated polypropylene being obtained by reacting a chlorinated polypropylene with a vinyl monomer containing a hydroxy group which is obtained by a reaction of an α, β-unsaturated carboxylic acid and a diol, or with 1,4-butene glycol, said diol being selected from the group consisting of ethylene glycol, diethylene glycol, propylene glycol, 1,4-butanediol, neopentyl glycol and 1,6-hexanediol, or said reactant chlorinated polypropylene being obtained by reacting a chlorinated polypropylene with a polymer formed by the addition polymerization of said vinyl monomer containing a hydroxy group and another vinyl monomer selected from the group consisting of alkyl esters and dialkyl esters of the α,β-unsaturated carboxylic acid, or said reactant chlorinated polypropylene being obtained by reacting a chlorinated polypropylene with a lactone polymer formed by the ring opening polymerization of lactones in the presence of an initiator selected from the group consisting of 3-butene-1-ol, 5-hexene-1-ol, 1,4-butenediol, hexenediol and polybutadiene glycol,

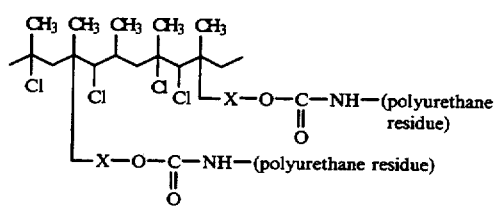

wherein X is the residue of said vinyl monomer, said polymer or said lactone polymer, (b) a reaction product, shown by the following formulas (2)-1 and (2)-2 produced by reacting 5-75 weight parts of a reactant chlorinated polypropylene having a molecular weight in the range of from 5,000 to 500,000 and a degree of chlorination in the range of from 20 to 60, and having at least one anhydride group with 25-95 weight parts of a polyurethane having a molecular weight in the range of from 1,000 to 150,000 and having in a molecule thereof 1 to about 1.17 hydroxyl groups, or primary amino groups, said reactant chlorinated polypropylene being obtained by reacting a chlorinated polypropylene with an anhydride of an α, β-unsaturated dibasic acid,

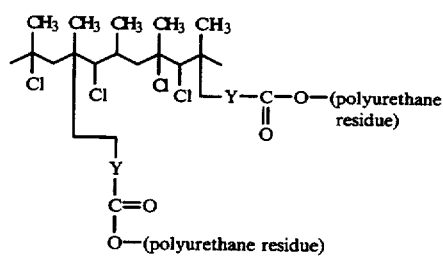

or

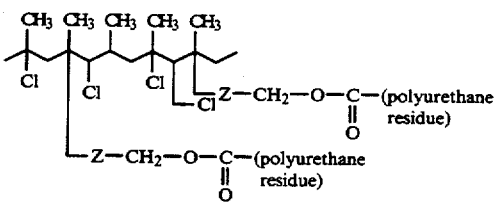

wherein Y is the residue of said, anhydride of an α, β-unsaturated dibasic acid, (c) a reaction product, shown by the following formulas (3)-1 and (3)-2 produced by reacting 5-75 weight parts of a reactant chlorinated polypropylene having a molecular weight in the range of from 5,000 to 500,000 and a degree of chlorination in the range of from 20 to 60, and having at least one epoxy group with 25-95 weight parts of a polyurethane having a molecular weight in the range of from 1,000 to 150,000 and having in a molecule thereof 1 to about 1.17 carboxyl groups, or primary amino groups, said reactant chlorinated polypropylene being obtained by reacting a chlorinated polypropylene with an epoxy group containing (meth)acrylate or an epoxidized polybutadiene,

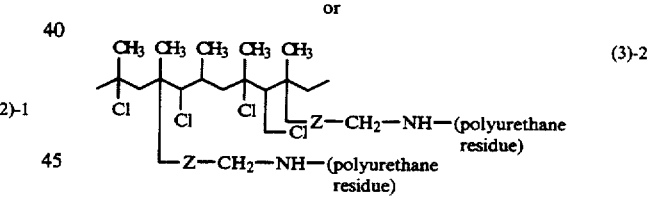

or

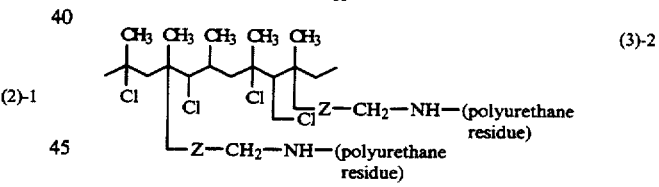

wherein Z is the residue of said (meth)acrylate or said epoxidized polybutadiene.

(B) with or without a pigment and (C) a solvent.

3. The coating composition according to claim 1 which is a printing ink.

4. The coating composition according to claim 1 which is a paint.

* * * * *